(12) United States Patent
Matsumoto et al.

(10) Patent No.: US 7,440,748 B2
(45) Date of Patent: Oct. 21, 2008

(54) TELEPHONE WHICH ENABLES TIMELY INPUT AND PRESENTATION OF INFORMATION

(75) Inventors: Fumiaki Matsumoto, Higashiosaka (JP); Kosuke Nagase, Ichinomiya (JP)

(73) Assignee: Sanyon Electric, Co., Ltd., Osaka (JP)

( * ) Notice: Subject to any disclaimer, the term of this patent is extended or adjusted under 35 U.S.C. 154(b) by 0 days.

(21) Appl. No.: 11/524,175

(22) Filed: Sep. 20, 2006

(65) Prior Publication Data

US 2007/0123230 A1 May 31, 2007

Related U.S. Application Data

(62) Division of application No. 10/080,167, filed on Feb. 21, 2002, now Pat. No. 7,130,617.

(30) Foreign Application Priority Data

Feb. 28, 2001 (JP) ............................. 2001-55710

(51) Int. Cl.
  *H04M 1/663* (2006.01)
  *H04M 3/42* (2006.01)
  *H04M 1/00* (2006.01)
  *H04M 11/10* (2006.01)
  *H04M 1/64* (2006.01)

(52) U.S. Cl. .................. 455/412.2; 455/413; 455/415; 455/566; 455/567; 379/68; 379/88.11; 379/88.12

(58) Field of Classification Search ............ 379/209.01, 379/68, 88.11, 88.12; 455/556.2, 412, 412.2, 455/413, 415, 566, 567

See application file for complete search history.

(56) References Cited

U.S. PATENT DOCUMENTS 5,065,309 A * 11/1991 Putnam et al. ......... 379/110.01
5,268,957 A * 12/1993 Albrecht ................. 379/209.01

(Continued)

FOREIGN PATENT DOCUMENTS

JP          06-164761          6/1994

(Continued)

OTHER PUBLICATIONS

'Telephony Call-Back Reminder Object'; Apr. 1, 1994; IBM Technical Disclosure Bulletin; vol. No. 37; Issue No. 4A; pp. 637-638.*

(Continued)

*Primary Examiner*—Fan Tsang
*Assistant Examiner*—Lisa Hashem

(57) ABSTRACT

A telephone includes: a reminding unit for, when judging that a user makes a call but fails to convey information to a party, reminding the user to input the information into information acceptance unit; the information acceptance unit for accepting input of the information from the user; a storage unit for associating the inputted information with a telephone number of the party and storing the associated information; and a notification unit for, when the user makes a call to the party or receives a call from the party, checking whether the information associated with the telephone number of the party is stored in the storage unit, and, if the associated information is stored therein, notifying the user of the stored information.

18 Claims, 6 Drawing Sheets

U.S. PATENT DOCUMENTS

| | | | |
|---|---|---|---|
| 5,337,346 A * | 8/1994 | Uchikura | 455/556.2 |
| 5,644,624 A * | 7/1997 | Caldwell | 379/69 |
| 5,652,789 A | 7/1997 | Miner et al. | |
| 6,029,063 A | 2/2000 | Parvulescu et al. | |
| 6,104,786 A * | 8/2000 | Gibilisco et al. | 379/88.23 |
| 6,169,786 B1 * | 1/2001 | Dunn et al. | 379/88.25 |
| 6,366,785 B2 * | 4/2002 | Saarela et al. | 455/466 |
| 6,442,251 B1 * | 8/2002 | Maes et al. | 379/93.23 |
| 6,636,733 B1 * | 10/2003 | Helferich | 455/412.2 |
| 6,694,126 B1 * | 2/2004 | Van Lente | 455/66.1 |
| 6,912,400 B1 * | 6/2005 | Olsson et al. | 455/466 |
| 7,130,617 B2 * | 10/2006 | Matsumoto et al. | 455/412.2 |
| 7,145,998 B1 * | 12/2006 | Holder et al. | 379/210.01 |
| 7,177,665 B2 * | 2/2007 | Ishigaki | 455/556.2 |
| 7,231,208 B2 * | 6/2007 | Robertson et al. | 455/416 |
| 2001/0049275 A1 * | 12/2001 | Pierry et al. | 455/414 |
| 2001/0050977 A1 * | 12/2001 | Gerszber et al. | 379/88.13 |
| 2003/0087665 A1 * | 5/2003 | Tokkonen | 455/556 |
| 2004/0013243 A1 * | 1/2004 | Harris | 379/67.1 |
| 2004/0066924 A1 * | 4/2004 | Wertsberger | 379/201.01 |
| 2004/0235520 A1 * | 11/2004 | Cadiz et al. | 455/557 |

FOREIGN PATENT DOCUMENTS

| | | |
|---|---|---|
| JP | 08-214057 | 8/1996 |
| JP | 09-154171 | 6/1997 |
| JP | 2000-022806 | 1/2000 |
| JP | 2000-151815 | 5/2000 |

OTHER PUBLICATIONS

Telephony Call-Back Reminder Object, Apr. 1, 1994, IBM Technical Disclosure Bulletin, vol. 37, Issue No. 4A, pp. 637-638.

* cited by examiner

FIG. 3

| TELEPHONE NUMBER | NAME | E-MAIL ADDRESS | SUBJECT OF NOTES |
|---|---|---|---|
| 090-1234-○×○× | TOKKYO TARO | Taro@○×△.ne.jp | RE: PARTY |
| 090-1234-○×△△ | TOKKYO JIRO | Jiro@□×□.ne.jp | ― |
| 090-1234-□△△△ | TOKKYO SABURO | 3ro@□×○.ne.jp | WAITING TIME |
| ............ | ............ | ............ | ............ |

FIG. 6

TELEPHONE NUMBER 090-1234-○×○×
TO: TOKKYO TARO

| WRITE | NOT WRITE |

NOTES : ■

FIG. 7

TELEPHONE NUMBER090-1234-□△△△
TO: TOKKYO SABURO
 CONTENTS :
1.WAITING TIME    6.CANCEL!
                  7.CIRCULAR NOTICE
2.RE: JOB         8.OTHERS
3.LET'S GO OUT!
4.EATING-OUT
5.REGULAR NOTICE

TELEPHONE WHICH ENABLES TIMELY INPUT AND PRESENTATION OF INFORMATION

CROSS-REFERENCE TO RELATED APPLICATIONS

This is a divisional application of U.S. Ser. No. 10/080,167, filed on Feb. 21, 2002 now U.S. Pat. No. 7,130, 617.

BACKGROUND OF THE INVENTION (1) Field of the Invention

The present invention relates to telephones provided with information storage capability and more particularly relates to technology that facilitates input/output of information.

(2) Description of the Related Art

It often happens that a phone user makes a call and cannot get through to a person at the other end, and that later, when the phone user tries to make a call to the same person or receives a call from the person, he/she cannot remember what he/she was going to tell by the original call.

To avoid such inconvenience, the user may take countermeasures to take information for the subject when the phone call cannot get through, and then refer to the information for telling the party the subject without omission when calling back or receiving a call from the party.

However, whether or not the user takes such a countermeasure depends on the user's willpower. Unless the user has a strong will power to take such a counter measure, it would be difficult to take the counter measure constantly. Thus, it is hard to say such a countermeasure as a measure for everyone to easily take.

Additionally, in the case where wireless telephones (hereafter called "mobile stations") such as mobile phones and the Personal Handyphone System (PHS) are used in the open air, it makes difficult to take the above-mentioned countermeasure, because the user might not carry writing materials or it takes some time to have writing materials ready.

In the open air that imposes these various constraints on the caller, in order to inform the party of information to be conveyed without omission, a user of a mobile station may use a text editing function such as electronic mail (hereafter called "e-mail") which is provided for the mobile station. This enables the user to record sentences on the information to be conveyed as text data, read out the recorded sentences immediately before calling back to the party, and reconfirm the subject.

Note here that, in the case that the party has a personal computer having access to the Internet connections or a mobile station equipped with the e-mail function, the user can simply transmit the above recorded e-mail to the party. However, even though personal computers and mobile phones recently spring into wide use, the ownership rate of normal wired telephones is still more than that of these devices. Therefore, it can be considered that there still remains many cases which require the above-mentioned countermeasure for taking notes, for instance, when making a phone call to the party who possesses a normal telephone only or when the caller has to directly talk with the party.

In such a case, however, the caller has to remember recording the sentences. Further, if the caller suddenly receives a call from the party even when remembering taking notes for the party, the caller has to confirm the contents of the recorded sentences by performing manipulations with buttons during a conversation with the party. Since such manipulations interrupt the conversation, it is hard to regard such a measure to take notes using the text editing function as a realistic one.

In this way, with any of the above-mentioned measures, the user cannot easily convey the information to the party without omission.

SUMMARY OF THE INVENTION

In view of the above-mentioned problems, the first object of the present invention is to provide a telephone which enables the user (i.e., caller) to convey the recorded information to the party without omission, even when the caller receives a call from the party after the original phone call which was not able to get through.

The second object of the present invention is to provide a method for conveying the information to the user in order to achieve the above-stated object.

Note here that the above-mentioned telephone includes wirelessly communicating mobile stations and normal wired telephones.

(1) In order to achieve the above first object, the telephone according to the invention is made up of: a reminding unit for, when judging that a user makes a call but fails to convey information to a party, reminding the user to input the information into information acceptance unit; the information acceptance unit for accepting input of the information from the user; a storage unit for associating the inputted information with a telephone number of the party and storing the associated information; and a notification unit for, when the user makes a call to the party or receives a call from the party, checking whether the information associated with the telephone number of the party is stored in the storage unit, and, if the associated information is stored therein, notifying the user of the stored information.

With this construction, when the user calls back to the party or receives a call from the party, the telephone notifies the user of the information, which enables the user to easily convey the information without omission.

That is, when making a phone call, the user can be notified of the information simply by performing normal calling process. Therefore, without the need for extra operations, every user can easily recognize the information to be conveyed and convey the information without omission.

(2) The above telephone (1) further may include a reception unit for, when receiving the call from the party, receiving a signal including the telephone number of the party as well. Here, the notification unit recognizes the telephone number of the party based on the received signal and performs the notification when the reception unit receives the signal.

With this construction, the telephone number of the party who calls to the user can be recognized, so that the notification is performed.

That is, when receiving a phone call, the user can be notified of the information simply by performing normal process for receiving a call. Therefore, without the need for extra operations, every user can easily recognize the information to be conveyed and convey the information without omission.

(3) In above (2), the reminding unit may make the judgement by detecting that a telephone line connecting operation has been completed before the call between the user and the party is established.

With this construction, when the line connecting operation has been completed before the call is established, the user is reminded to input the information independently of the user's will power, which prevents the user from missing an opportunity for inputting the information.

(4) In above (3), the information acceptance unit may inquire of the user whether or not to input the information and accept the input of the information only when the user wishes to input the information.

This construction can avoid unnecessary acceptance for input of information.

(5) In above (4), the information acceptance unit may accept input of text data, and the notification unit may perform the notification by displaying the accepted text data on a display of the telephone.

With this construction, the user can convey the information without omission by referring to the displayed text data.

(6) In above (5), the reminding unit may remind the user to input the information by displaying an input screen for the user to input the information. [claim 6]

With this construction, the reminder process and the preparation for the input screen are concurrently performed. Therefore, acceptance for the input of the information can be promptly conducted.

(7) In above (6), the information acceptance unit may accept the input of the information by displaying a plurality of options for the information, which allows the user to select one of the options.

This construction saves the user from having to input text data one by one, and therefore acceptance for the input of the information can be more easily and promptly performed.

(8) The above telephone (7) further may include vibration unit for making the body vibrate in accordance with the reminder by the reminding unit.

With this construction, the reminding process can be effectively conducted also to users who do not see the display.

(9) In above (8), the vibration unit further may make the body vibrate in accordance with the notification by the notification unit.

With this construction, users, who cannot see the display because they put the telephone onto their ears, can recognize the notification.

(10) The above telephone (7) further may include a lighting unit for lighting up or flashing predetermined portions in accordance with the reminder by the reminding unit.

With this construction, the reminding process can be more securely performed by drawing the user's attention with conspicuous signs of lighting up or flashing the predetermined portions in the telephone.

(11) In above (10), the lighting unit further may light up or flash the predetermined portions in accordance with the notification by the notification unit.

With the construction, the user can easily recognize the notification.

(12) In above (4), the inquiry may be made by sounds.

With this construction, the inquiry is performed using sounds, and therefore the user can securely recognize the inquiry.

(13) In above (12), the information acceptance unit may accept the input of the information by sounds, and the notification unit may give the notification by reproducing the accepted sounds.

With this construction, the user can convey the information without omission by hearing the reproduced sounds.

(14) In above (13), the information acceptance unit further may accept, from the user, an instruction for reproducing the inputted sounds, and the notification unit, if the instruction is given while the call being established, may reproduce the sounds associated with the telephone number of the party, so that the party can hear the reproduced sounds.

This construction saves the user from having to hear the information and restate the information, and therefore burdens on the user for conveying the information can be reduced.

(15) In above (2), the reminding unit may make the judgement by detecting that a duration of the call between the user and the party is shorter than a predetermined duration.

With this construction, when there is no adequate time to convey the information to the party even though the call can get through, input of the information can be accepted. Thereby, the information can be easily recorded before the user forgets the information.

(16) In order to achieve the second object, the method for notifying an user of information to be conveyed to the party according to the invention includes the steps of: a reminding step for, when judging that the user makes a call but fails to convey information to a party, reminding the user to input the information; the information acceptance step for accepting input of the information from the user; a storage step for associating the inputted information with a telephone number of the party and storing the associated information; and a notification step for, when the user makes a call to the party or receives a call from the party, checking whether the information associated with the telephone number of the party is stored in the storage step, and, if the associated information is stored therein, notifying the user of the stored information.

With this method, when the user calls back to the party or receives a call from the party, the telephone notifies the user of the information, which enables the user to easily convey the information without omission.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows a construction of the table recorded in the recording unit;

FIG. 6 is one example of the screen, which is displayed by the display unit in the notes input procedure; and FIG. 7 is another example of the screen which is displayed by the display unit in the notes input procedure.

DESCRIPTION OF THE PREFERRED EMBODIMENT

The following describes a telephone according to the invention, with reference to the drawings.

<Construction>

Figure 1:
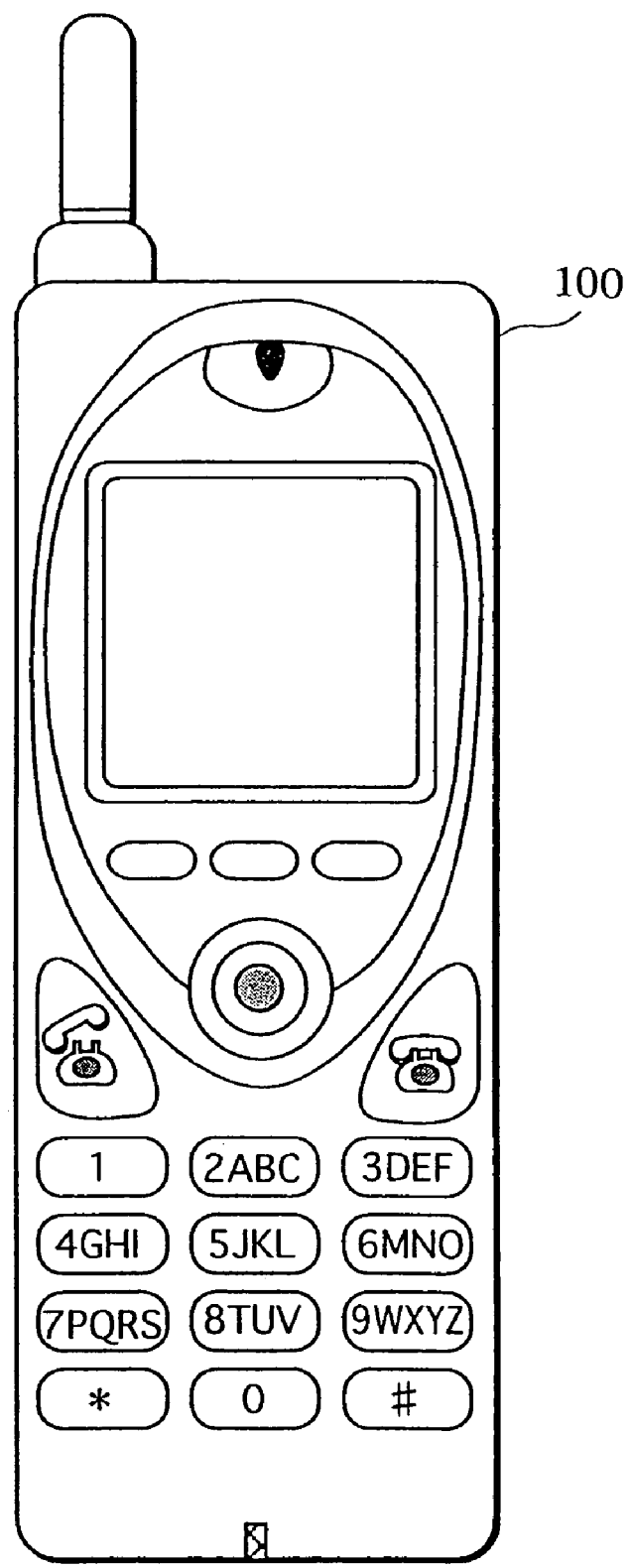
FIG. 1 is an external view of a mobile station according to one embodiment of the invention.

FIG. 1 is an external view of a mobile station 100 according to one embodiment of the invention.

The mobile station 100 is a mobile phone which wirelessly communicates data (hereafter called "communication data") such as sounds, images, and e-mail.

The mobile station 100 includes a display, ten keys, other control buttons, a speaker, and a microphone. All these components are arranged in front of the case. This construction provides the most popular shape for a mobile station.

Figure 2:
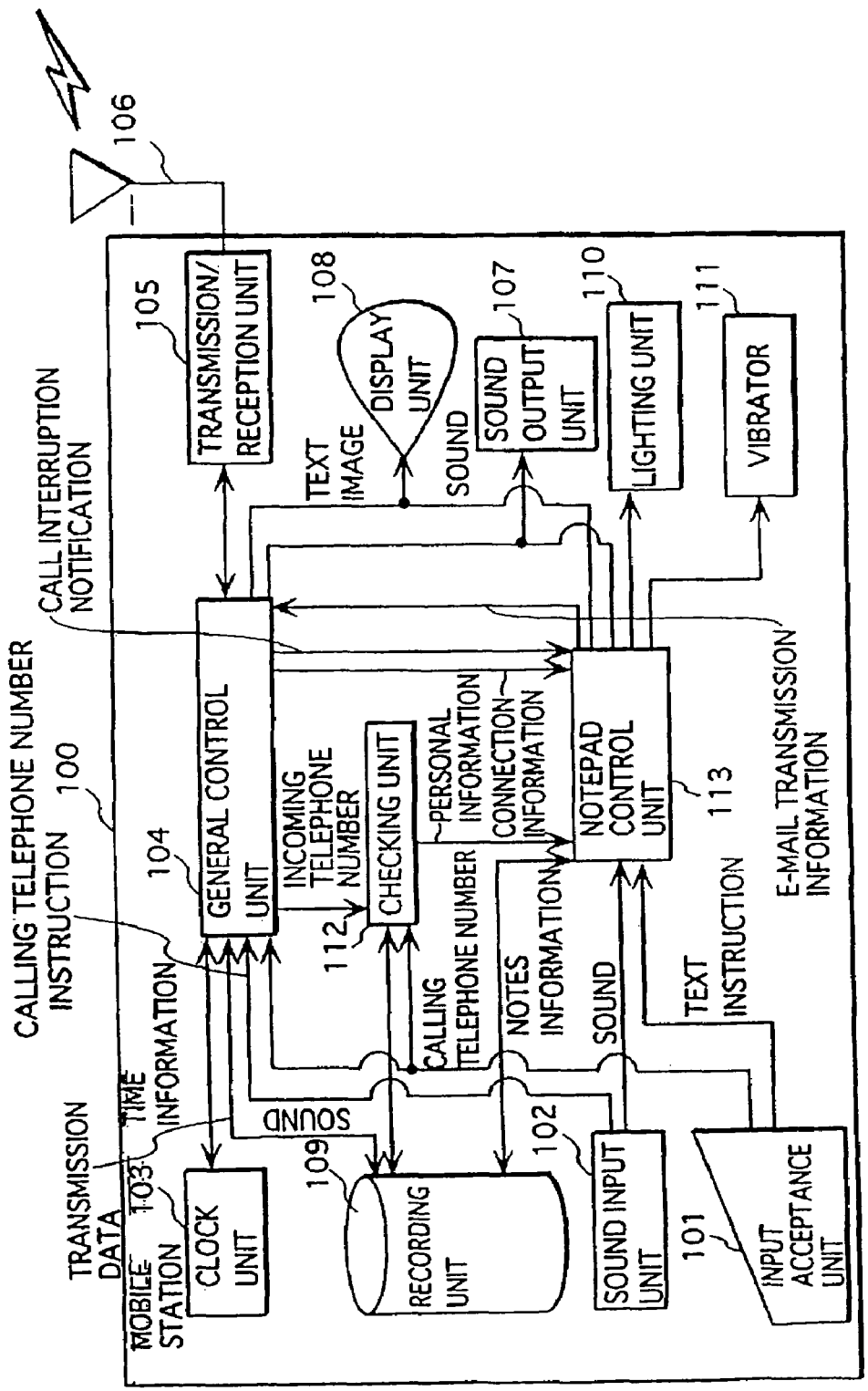
FIG. 2 is a block diagram in terms of functions of the mobile station according to one embodiment of the invention.

FIG. 2 is a block diagram in terms of functions of the mobile station 100 according to this embodiment.

The mobile station 100 is made up of an input acceptance unit 101, a sound input unit 102, a clock unit 103, a general control unit 104, a transmission/reception unit 105, an antenna unit 106, a sound output unit 107, a display unit 108, a recording unit 109, a lighting unit 110, a vibrator 111, a checking unit 112, and a notepad control unit 113.

The input acceptance unit 101 includes ten keys for inputting character strings used for such as telephone numbers and e-mail. The input acceptance unit 101 outputs the information such as telephone numbers inputted using these keys to the general control unit 104 and the notepad control unit 113.

Hereafter, among telephone numbers, those which are inputted for originating a call will be referred to as "calling telephone numbers".

The sound input unit 102 is a device for inputting sounds such as a microphone, which outputs the inputted sounds to the general control unit 104 and the notepad control unit 113.

The clock unit 103 is a clock including an oscillator, which calculates the current time and outputs the calculated current time to the general control unit 104.

The recording unit 109 is a recording medium such as a nonvolatile memory, which records the data output from the general control unit 104 and the notepad control unit 113.

The general control unit 104 includes a Digital Signal Processor (DSP) for controlling general procedures of the wireless phone. When the input acceptance unit 101 accepts a calling telephone number and an instruction for connection, the general control unit 104 performs a procedure for originating a call for the telephone with the calling telephone number so as to establish communication between them (hereafter called "calling procedure").

The calling procedure includes the follows: That is, in the case where the communication can be established after originating a call, the general control unit 104 outputs information such as a duration of the call and the telephone number of the called party (hereafter they are called "connection information") to the notepad control unit 113. Conversely, in the case where the communication cannot be established, the general control unit 104 outputs notification that the calling was interrupted and information such as the telephone number of the called party (hereafter called "call interruption notification") to the notepad control unit 113.

When the user receives a call from the party, the general control unit 104 also performs a procedure for establishing communication (hereafter called "incoming procedure").

The incoming procedure includes a procedure for notifying the user of the telephone number of the party (hereafter called "incoming telephone number") and outputting the same to the checking unit 112.

Here, when the user receives a call from a telephone for which caller ID blocking is turned on, the above-stated incoming telephone number cannot be received, so that the user is not notified of the incoming telephone number.

Although the above-stated procedures concerns conversation, the general control unit 104 also performs a procedure for transmitting data such as e-mail and images (hereafter called "data transmission procedure") and a procedure for receiving the same (hereafter called "data reception procedure").

Since these data transmission/reception procedures are well-known technology, detailed description on these procedures will be omitted.

The transmission/reception unit 105 is a wireless circuit including a filter and an amplifier, which transmits and receives wireless signals. In accordance with the instruction from the general control unit 104, the transmission/reception unit 105 wirelessly transmits the communication data such as sounds, images, and texts. Further, the transmission/reception unit 105 receives the communication data addressed to the mobile station 100 from the outside and outputs the same to the general control unit 104.

Here, the mobile station 100 is described as a target for a so-called "calling telephone number notification service" by which the user is notified of the telephone number of the caller. Therefore, except for the case where the user receives a call from a telephone for which caller ID blocking is turned on, data from the outside includes the telephone number of the party, that is, information on the incoming telephone number.

The antenna unit 106 is a whip antenna which is tuned to the carrier wave for the mobile station 100.

The sound output unit 107 is a speaker including a piezoelectric element, which outputs sounds according to the signals received from the general control unit 104 and the notepad control unit 113.

The display unit 108 is a liquid crystal display (LCD), which displays texts and images according to the signals received from the general control unit 104 and the notepad control unit 113.

The lighting unit 110 is a backup lighting device for lighting up the input acceptance unit 101 and the display unit 108 (i.e., the ten keys and the LCD). The lighting unit 110 has a function for illuminating or flashing according to the instruction from the notepad control unit 113.

The vibrator 111 functions so as to call the user's attention by vibration.

When receiving a call interruption notification from the general control unit 104, the notepad control unit 113 performs a procedure for having the screen for waiting the input from the user displayed, accepting input of the subject to be informed, and recording the accepted contents on the recording unit 109 (hereafter called "notes input procedure").

More specifically, the notepad control unit 113, when receiving the call interruption notification from the general control unit 104, obtains the calling telephone number included in the notification, reads out information (e.g., a name) associated with the telephone number (hereafter called "personal information") from the recording unit 109. Then, the notepad control unit 113 outputs a signal, to the display unit 108, for displaying the telephone number and the personal information and a signal for displaying a message inquiring of the user whether or not to start acceptance of the information, and vibrates the vibrator 111.

When receiving an instruction to start accepting the information from the input acceptance unit 101, the notepad control unit 113 instructs the input acceptance unit 101 to accept input of information for adding newly information to the above-stated personal information. Specifically, the newly added information is the contents which was not given to the party because the phone call did not get through (hereafter called "subject of notes"). Then, the notepad control unit 113 receives the subject of notes from the input acceptance unit 101.

If the above-stated personal information includes an e-mail address, the notepad control unit 113 has the display unit 108 display a message inquiring of the user whether or not to send e-mail on the above subject of notes to the e-mail address. Then, if receiving an instruction to send the e-mail from the user, the notepad control unit 113 sends the subject of notes to the e-mail address. Specifically, the notepad control unit 113 instructs the general control unit 104 to execute the data transmission procedure.

According to the instruction, the notepad control unit 113 outputs the e-mail address and the subject of notes to the general control unit 104.

The procedure by the notepad control unit 113 as stated above will be called an "e-mail transmission procedure".

On the other hand, if receiving an instruction not to send the e-mail from the user, the notepad control unit 113 adds the subject of notes accepted by the input acceptance unit 101 to the above-stated personal information and stores the same in the recording unit 109.

That is the description of the notes input procedure and the e-mail transmission procedure.

Meanwhile, when the phone call gets through, the notepad control unit 113 receives information (i.e., connection information) indicating that the phone call got through and including a duration of the call, the telephone number of the party, etc. from the general control unit 104. If the duration of the call included in the connection information is 30 seconds or shorter, the notepad control unit 113 conducts the above-stated notes input procedure.

This is because, in the case of the duration of the call being 30 seconds or shorter, it can be expected that, although the connection was established, the answering machine of the called party was on and the caller hung up the phone before telling the information to be conveyed.

On the other hand, if the duration of the call is more than 30 seconds, the notepad control unit 113 does not conduct the above-stated notes input procedure.

Meanwhile, when receiving an incoming call, the notepad control unit 113 conducts a procedure for displaying the personal information (hereafter called "notes notification procedure") as follows.

That is, when the checking unit 112 inputs the personal information, i.e., the user gets a phone call, the notepad control unit 113 outputs the telephone number, the name, and the subject of notes included in the inputted personal information to the display unit 108, while outputs a signal for vibrating the vibrator 111 for 10 seconds from the time when the communication has been established.

This vibration functions as a sign for the user so as not to continue a conversation without aware of the subject of notes being displayed, because the user puts the mobile station 100 onto his/her ear, which makes the display unit 108 out of the user's sight.

The checking unit 112, when receiving the incoming telephone number from the general control unit 104, refers to the personal information recorded in the recording unit 109 and judges whether the same telephone number as the incoming telephone number is included therein. In the case where the same telephone number is included, the checking unit 112 reads out the personal information associated with the telephone number and outputs the same to the notepad control unit 113.

<Data>

That is the explanation of each unit in the mobile station 100. The following describes a table 200 concerning personal information stored in the recording unit 109.

FIG. 3 shows a construction of the table 200.

In a telephone number section 201, telephone numbers which are inputted by the user or obtained as incoming telephone numbers are described.

In a name section 202, the names corresponding to the telephone numbers at the left side in the same line are described.

These names are inputted by the user.

In an e-mail address section 203, e-mail addresses corresponding to the telephone numbers at the left side in the same line are described.

These e-mail addresses are inputted by the user.

In a subject of notes section 204, the subjects of notes which are inputted in the notes input procedure are described.

Among of these data, names, e-mail addresses, and the subjects of notes are stored in the text format.

<Operations>

Figure 4:
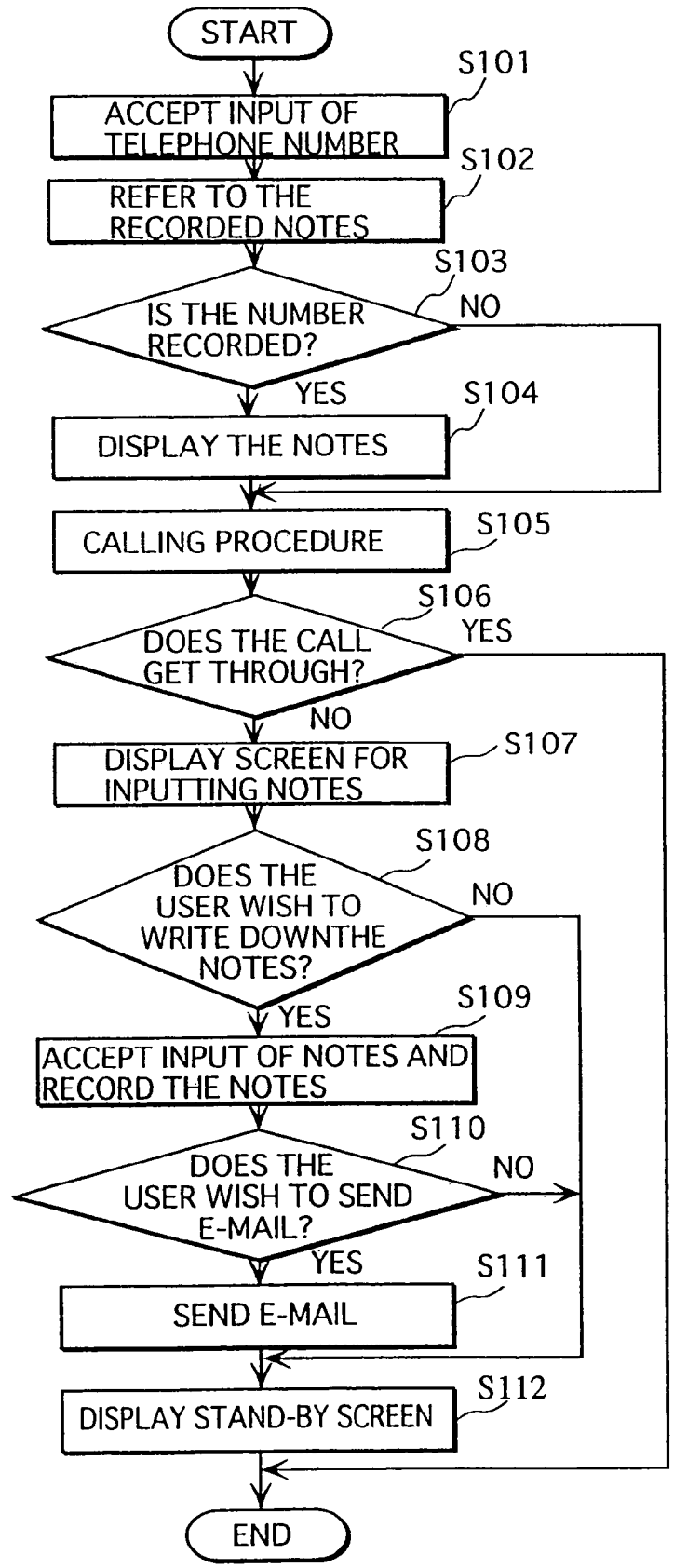
FIG. 4 is a flowchart showing procedures conducted by the notepad control unit when the user makes a phone call, (i.e., the notes input procedure and the notes display procedure)

FIG. 4 is a flowchart showing procedures conducted by the notepad control unit 113 when making a phone call, i.e., the notes input procedure, the e-mail transmission procedure, and the notes display procedure.

The input acceptance unit 101 accepts a calling telephone number and outputs the same to the general control unit 104 and the notepad control unit 113 (Step S101).

The notepad control unit 113 refers to the received calling telephone number and the table 200 recorded in the recording unit 109 (Step S102) and judges whether the same telephone number as the calling telephone number is included in the table (Step S103). If the same telephone number is included in the table, the notepad control unit 113 reads out the personal information concerning the telephone number (e.g., telephone number, name, e-mail address, and subject of notes) and has the display unit 108 display the read personal information (Step S104).

On the other hand, if the same telephone number is not included in the table 200, the notepad control unit 113 does not conduct the above procedure for having the display unit 108 display the information.

Then, the general control unit 104 conducts a procedure for calling the party with the received calling telephone number to establish the communication (i.e., calling procedure) (Step S105) and judges whether the calling is interrupted before establishing the communication (Step S106). If the communication can be established, this procedure is completed.

On the other hand, if the communication cannot be established, the notepad control unit 113 displays the calling telephone number and a screen for accepting input of the subject of notes which should have been conveyed (Step S107) so as to inquire of the user whether the user wishes to write down the subject of notes on the screen (Step S108). If the user does not wish to write down it, the procedure is completed.

In the step S108, if accepting the instruction to write down the subject of notes, the notepad control unit 113 has the display unit 108 display a screen for accepting the input of the subject of notes, accepts the input of the subject of notes from the input acceptance unit 101. Then, the notepad control unit 113 associates the accepted subject of notes with personal information corresponding to the telephone number obtained in Step S101 and stores it in the recording unit 109 (Step S109).

Following this, the notepad control unit 113 has the display unit 108 display a message for inquiring of the user whether the user wishes to send e-mail (Step S110). If receiving an instruction not to send e-mail from the input acceptance unit 101, the notepad control unit 113 has the general control unit 104 display a standby screen (Step S112) to complete the procedure.

If the personal information corresponding to the calling telephone number does not include an e-mail address, the notepad control unit 113 does not have the display unit 108 display the message concerning the e-mail transmission, but conducts the procedure for displaying the general control unit 104 display the standby screen to complete the procedure (i.e., Step S112).

On the other hand, if receiving an instruction to send e-mail from the input acceptance unit 101, the notepad control unit 113 transmits the subject of notes to the e-mail address indicated in the personal information associated with the subject of notes (Step S111) and then has the general control unit 104 display the standby screen (Steps S112) to complete the procedure.

Figure 5:
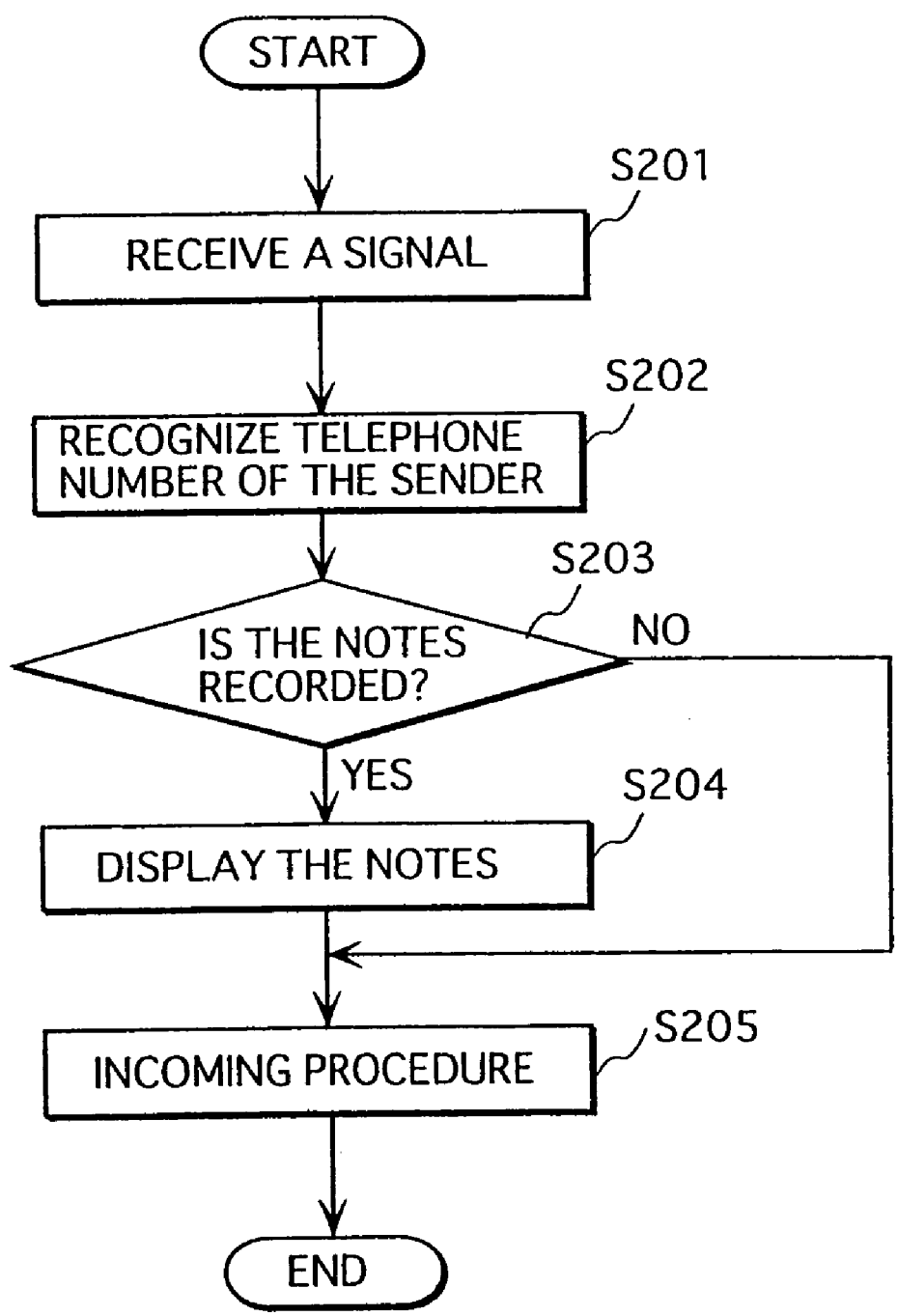
FIG. 5 is a flowchart showing the procedure conducted by the notepad control unit when the user receives an incoming call (i.e., notes display procedure)

Meanwhile, FIG. 5 is a flowchart showing the procedure conducted by the notepad control unit 113 when receiving an incoming call (i.e., notes display procedure).

The transmission/reception unit 105 receives communication data such as sounds, images, and texts transmitted from the outside to the mobile station 100 (Step S201). Then, the transmission/reception unit 105 extracts and recognizes the telephone number of the sender on the basis of the information indicating the telephone number which is included in the communication data (Step S202), refers to the table 200 recorded in the recording unit 109 to judge whether the personal information concerning the telephone number includes the subject of notes (Step S203). If the personal information includes the subject of notes, the transmission/reception unit 105 has the display unit 108 display it (Step S204), has the general control unit 104 conduct the incoming procedure (Step S205) to complete the procedure.

FIG. 6 is one example of the standby screen, which is displayed by the display unit 108 in the notes input procedure, for waiting the input from the user. On the screen, the telephone number, the name, and the message for the user to make a choice about whether to write down the notes or not, and the section for writing the subject of notes are provided.

FIG. 7 is another example of the standby screen. On this screen, the telephone number and the name are provided like FIG. 6. Instead of the section for writing the subject of notes as in FIG. 6, items such as "Re waiting time" which is predetermined options as the subject of notes are provided. These options are surrounded with a box for allowing the user to select one of them.

These options saves the user from having to input texts one by one.

As stated above, according to this embodiment, even when the phone call does not get through, which interrupts the user's thinking, the screen for inputting notes is displayed, and the mobile station vibrates so as to call the user's attention to input the notes. Therefore, the user can easily input the subject of notes. Further, if the notes has been inputted for the party, when the user calls back to the party or receives a call from the party, the user can inform the party of the information to be conveyed without omission, because the subject of notes is displayed on the phone.

Note here that, although the mobile station 100 is a mobile phone in the above embodiment, the invention is also applicable to wireless telephones such as PHS or conventional wired telephones.

The above embodiment exemplifies the mobile phone having the construction where a display, ten keys, other control buttons, a speaker, a microphone, and the like are arranged on one case. However, naturally, the invention is also applicable to foldable mobile phones having two parts connecting via a hinge in which a cover for the enclosure is opened/closed with the hinge as a supporting point, which have been widely used, and other mobile phones, for example, whose lid can slide to open/close the phone.

The above embodiment describes the mobile station 100 as a target for a so-called "calling telephone number notification service" by which the user is notified of the telephone number of the caller. However, the invention is also applicable to the phones which are not targets for such a service.

In such a case, when receiving a phone call, even if the subject of notes corresponding to the incoming telephone number is recorded in the recording unit 109, such subject of notes is not displayed on the phone.

In the above embodiment, when receiving a call interruption notification from the general control unit 104, the notepad control unit 113 obtains the calling telephone number included in the notification, reads out personal information from the recording unit 109, and outputs a signal for displaying the telephone number and the personal information to the display unit 108. At the same time, the notepad control unit 113 instructs the input acceptance unit 101 to accept new subject of notes and instructs the vibrator 111 to vibrate. As a result, the notepad control unit 113 receives the subject of notes from the input acceptance unit 101. However, instead of giving the input acceptance unit 101 the instruction to accept the input of the subject of notes, the notepad control unit 113 may instruct the sound input unit 102 to accept input of sounds, then receive sound signals indicating the information which should have been conveyed to the party, add these sound signals to the personal information, and store it in the recording unit 109.

In such a case, when the checking unit 112 inputs the personal information, the notes notification procedure conducted by the notepad control unit 113 is performed by outputting the sounds included in the inputted personal information to the sound output unit 107. In addition, the subjects of notes included in the subject of notes section 204 of the table 200 is not text data but sound data.

Furthermore, when the user receives a phone call from the party or when the user calls back to the party, and the phone call can get through, the above-stated sounds may be reproduced so that the party can hear the sounds.

This process reduces the burdens on the user to tell the subject of notes to the party.

In the above embodiment, when the checking unit 112 inputs the personal information, i.e., the user gets a phone call, the notepad control unit 113 outputs a signal for displaying the personal information to the display unit 108, while outputs a signal for vibrating the vibrator 111 for 10 seconds from the time when the communication has been established. However, the notepad control unit 113 may output a signal for flashing or turning on the lighting unit 110 for 10 seconds from the time when the communication has been established. Additionally, instead of giving the vibrator 111 to vibrate when receiving input of the subject of notes, the notepad control unit 113 may give the lighting unit 110 an instruction to flash or light up.

In such a case, the user can find by the lighting unit 110 flashing or lighting up that the subject of notes corresponding to the party is recorded in the personal information and the telephone reminds the user of input the subject of notes.

In addition, instead of the vibration, a sound message such as "The notes for the party is recorded. Do you display the contents or reproduce the sounds?" may be used for notifying the user that the subject of notes has been recorded and inquiring of the user whether the user wishes to be informed of the subject of notes.

In the above embodiment, if the duration of the call included in the connection information is 30 seconds or shorter, the notepad control unit 113 conducts the notes input procedure. Further, when receiving a phone call from the outside, the notepad control unit 113 in the above embodiment outputs the subject of notes and the like to the displaying unit 108, while making the vibrator 111 vibrate for 10 seconds since the communication has been established. However, these duration of time, i.e., 30 seconds and 10 seconds, are just examples, and the user can freely set these duration of time.

Naturally, the duration of time for making the lighting unit 110 turn on or flash may be set at a duration of time other than 10 seconds.

In the above embodiment, when receiving a call interruption notification, the notepad control unit 113, has the standby screen for waiting for input from the user displayed. Additionally, such a standby screen may be also displayed so that the input acceptance unit 101 accepts input from the user, when the user receives a phone call, the phone call can get through, and communication has been completed.

In such a case, the user can record the information that the user forgot to and was not able to convey to the party during a conversation can be recorded.

In the above embodiment, e-mail addresses in the table 200 are inputted by the user. However, when receiving e-mail, if the name of the sender has been recorded in the table 200, then e-mail address of the sender may be automatically inserted into the e-mail address section 203 in the same line as the name of the sender.

In such a case, the general control unit 104 outputs the name and e-mail address of the e-mail sender in addition to the received telephone number to the checking unit 112.

Then, the checking unit 112 judges whether the name of the e-mail sender has been recorded in the table 200. In the case where the name has been recorded there, the checking unit 112 notifies the notepad control unit 113 that the name has been recorded and the name and e-mail address of the sender.

Following this, the notepad control unit 113 records the e-mail address in the e-mail address section 203 in the same line as the name of the sender.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A telephone comprising:
   information acceptance means for accepting input of information from a user;
   reminding means for, when judging that the user makes a call but fails to convey information to a party, reminding the user to input first information into the information acceptance means;
   storage means for associating the inputted first information with second information that identifies the party, and storing the associated information;
   displaying means for displaying the second information when the reminding means reminds the user to input the first information;
   instruction acceptance means for accepting an instruction from the user;
   inquiring means for, if the user has input the first information and the second information which includes an e-mail address, inquiring of the user whether to transmit the first information to the e-mail address; and
   transmission means for transmitting the first information to the e-mail address if the instruction acceptance means accepts, from the user, an instruction for transmitting the first information to the e-mail address.

2. The telephone of claim 1, further comprising
notification means for, when the user makes a call to the party or receives a call from the party, checking whether the first information associated with the second information is stored in the storage means, and, if stored, notifying the user of the first information.

3. The telephone of claim 2, further comprising
reception means for receiving a signal including a telephone number of the party, wherein
the notification means recognizes the telephone number of the party based on the received signal when the reception means receives the signal.

4. The telephone of claim 2, wherein
the information acceptance means accepts input of text data, and
the notification means performs the notification by displaying the accepted text data on a display of the telephone.

5. The telephone of claim 4, wherein
the information acceptance means accepts the input of the first information by displaying a plurality of options for the first information, which allows the user to select one of the options.

6. The telephone of claim 2, wherein
the information acceptance means accepts sounds, and
the notification means gives the notification by reproducing the accepted sounds.

7. The telephone of claim 2, further comprising
vibration means for making body of telephone vibrate in accordance with the notification by the notification means.

8. The telephone of claim 2, further comprising
lighting means for lighting up or flashing predetermined portions of the telephone in accordance with the notification by the notification means.

9. The telephone of claim 1, wherein
the reminding means judges that the user has made the call but fails to convey information to the party if detecting that a telephone line connecting operation has been completed before the call between the user and the party is established.

10. The telephone of claim 1, wherein
the reminding means judges that the user has made the call but fails to convey information to the party if detecting that a duration of the call between the user and the party is shorter than a predetermined duration.

11. The telephone of claim 1, wherein
the information acceptance means inquires of the user whether or not to input the information, and accepts the input of the information only when the user wishes to input the information.

12. The telephone of claim 1, wherein
the reminding means reminds the user to input the first information by displaying an input screen for the user to input the first information.

13. The telephone of claim 1, further comprising
notification means for, when the user makes a call to the party or receives a call from the party, checking whether the first information associated with the second information is stored in the storage means, and, if stored, notifying the user of the first information.

14. The telephone of claim 1, wherein
the reminding means judges that the user has made the call but fails to convey information to the party if detecting that a telephone line connecting operation has been completed before the call between the user and the party is established.

15. The telephone of claim 1, wherein
the reminding means judges that the user has made the call but fails to convey information to the party if detecting that a duration of the call between the user and the party is shorter than a predetermined duration.

16. The telephone of claim 1, wherein
the information acceptance means inquires of the user whether or not to input the information, and accepts the input of the information only when the user wishes to input the information.

17. The telephone of claim 1, wherein
the reminding means reminds the user to input the first information by displaying an input screen for the user to input the first information.

18. A method for notifying a user of information to be conveyed to a party, the method comprising:

an information acceptance step of accepting input of information from the user;

a reminding step of, when judging that the user makes a call but fails to convey information to a party, reminding the user to input first information;

a storage step of associating the inputted first information with second information that identifies a party, and storing the associated information;

a displaying step of displaying the second information when the reminding step reminds the user to input the first information;

an instruction acceptance step of accepting an instruction from the user;

an inquiring step of, if the user has input the first information and the second information includes an e-mail address, inquiring of the user whether to transmit the first information to the e-mail address; and a transmission step of transmitting the first information to the e-mail address if the instruction acceptance means accepts, from the user, an instruction for transmitting the first information to the e-mail address.

* * * * *